Aug. 10, 1926.

H. SMITH 1,595,885

VEHICLE SNUBBER AND SHOCK ABSORBER

Filed August 18, 1924    2 Sheets-Sheet 1

INVENTOR.
Henry Smith
BY
ATTORNEY.

Aug. 10, 1926.

H. SMITH 1,595,885

VEHICLE SNUBBER AND SHOCK ABSORBER

Filed August 18, 1924   2 Sheets-Sheet 2

INVENTOR.
Henry Smith
BY
ATTORNEY.

Patented Aug. 10, 1926.

1,595,885

UNITED STATES PATENT OFFICE.

HENRY SMITH, OF LONDON, ENGLAND.

VEHICLE SNUBBER AND SHOCK ABSORBER.

Application filed August 18, 1924. Serial No. 732,766.

The invention relates to vehicle snubbers and has among its objects to provide a device of the character specified which shall be of simple construction. Another object of the invention is to provide means for effectively absorbing the road shocks of automobiles or other vehicles. A further object of the invention lies in the provision of a snubber which is capable of being manufactured at a low cost.

With these and other objects in view, the invention resides in the novel features of construction and combinations and arrangements of parts as more fully hereinafter described and claimed.

Referring to the drawings which are made a part thereof and in which similar reference characters indicate corresponding parts:—

Figure 2:
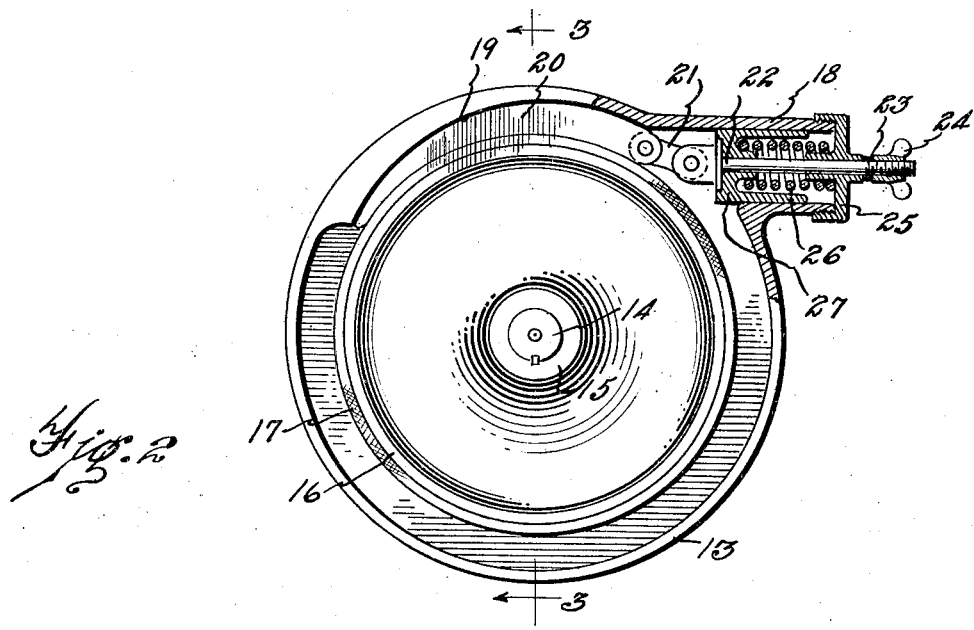
Figure 2 is a sectional view of the snubber.

Referring to the drawings, reference character 10 indicates the chassis or frame of an automobile or other vehicle having the axle 11 carrying the vehicle wheels in any suitable manner. Suitably fastened on the frame 10, as by screw bolts 12, is a drum housing 13. The drum housing is provided with a transverse bore affording a bearing for the rotatable shaft 14. A drum 15 is keyed to shaft 14 and rotatably mounted within drum housing 13. The drum 15 is formed with a peripheral face 16 upon which is mounted a friction brake band 17. The drum housing is formed with a bored projection 18 and an inner face 19 preferably curved eccentrically with respect to the drum center as shown in Figure 2. Between the band 17 and the face 19 a wedge shaped braking element 20 is provided having an inner face curved to contact with the band 17 and an outer face preferably curved to correspond with the face 19 of housing 13. To one end of the brake element 20 is pivoted the link 21. The other end of the link is pivoted to an axially movable adjusting rod 22 threaded at 23 to receive a nut 24. A cap 25 forms a closure for the bored projection 18, the outer face of the cap serving as an abutment for nut 24 as will be presently apparent. A spring 26 bears at one end against the inner face of cap 25 and at the other end against a cup shaped member 27 which is carried by rod 22.

A horizontally extending arm 28 is keyed at one end with the shaft 14 and is pivotally connected at 32 to a vertically extending rod 29 preferably adjustable in length as at 30. The lower end of rod 29 is secured to a fastening 31 mounted on the axle 11. A nut 33 and washer 34 serve to position the arm 28.

Figure 1:
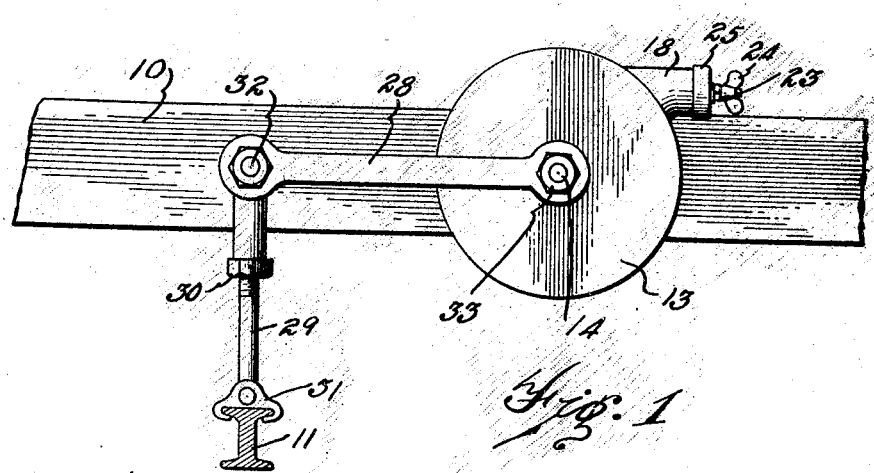
Figure 1 is an elevation showing my snubber attached to an automobile chassis.
Figure 3:
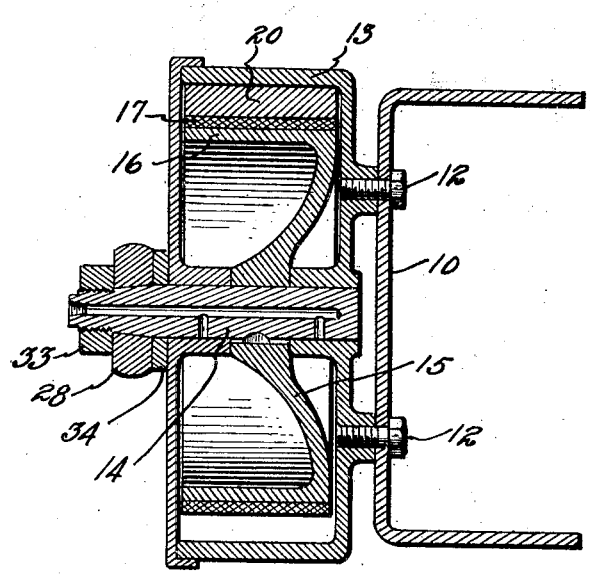
Figure 3 is a view along the line 3—3 of Figure 2.

In operation, when the vehicle strikes an obstruction the axle 11 will be moved toward the frame 10 forcing rod 29 upwardly and causing arm 28 to rotate the drum 15 through the shaft 14, in a clockwise direction as viewed in Figure 2. Movement of the drum in this direction is unaffected by the wedge shaped braking element 20, the drum surface sliding with respect to the contacting surface of the brake element 20. Spring 26 acts through the link 21 to maintain the position of the brake element as shown in Figure 2. However, when the axle 11 moves downwardly, as viewed in Figure 1, on its rebound, the drum 15 frictionally engages the brake element 20 tending to rotate the same in a counter clockwise direction. The spring 26 aids the movement of the brake element in this direction. Movement of the brake element is prevented by reason of its wedge shape acting along the face 19 of drum housing 13. Movement of the axle 11 is thus checked. The position of the brake element 20 may be adjusted by reason of the nut 24 in order to obtain the desired amount of braking for the reciprocations of the vehicle axle. The spring 26 tends to maintain the brake element in its adjusted counter clockwise position, aiding also to increase the frictional resistance at the friction band 17 during the braking or snubbing movement of the axle.

Figure 4:
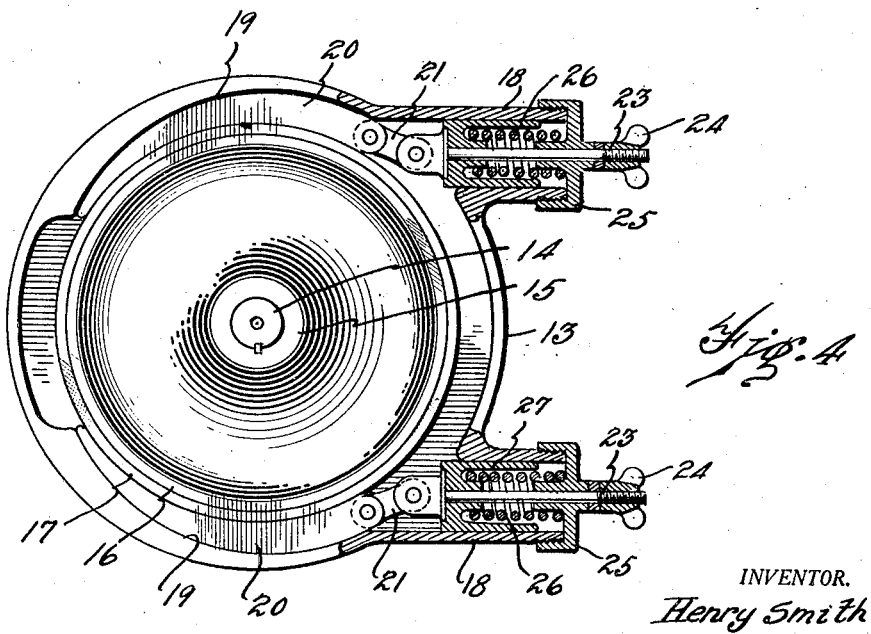
Figure 4 is a sectional view of a modification showing a shock absorber embodying the principal features of my invention.

Referring to Figure 4, I have disclosed a shock absorber embodying a modified form of my invention. In this construction a second wedge shaped brake element 20′, similar to the element 20, is positioned to act on the drum 15 when the latter is rotated in a clockwise direction corresponding to an upward movement of the axle 11. Thus, movement of the axle is resisted in each direction.

While I have shown only one brake element acting on the drum in any direction it is obvious that any number might be employed engaging the periphery of the friction band.

While it is believed that from the foregoing description, the nature and advantages of my invention will be readily understood, I desire to have it understood that I do not limit myself to what is herein shown and described and that such changes may be resorted to when desired as fall within the scope of what is claimed.

What I claim as my invention is:

1. A vehicle snubber comprising a drum housing immovably carried by the vehicle frame, a drum having a friction surface movable with the vehicle axle, and a wedge shaped braking element contacting with the drum housing for offering resistance to their relative movement.

2. A vehicle snubber comprising a drum housing carried by the vehicle frame, a drum rotatable within the housing, means connecting the vehicle axle and drum for rotating the latter, a friction band carried by the drum, and a wedge shaped braking member mounted between the drum and housing for offering resistance to their relative movement.

3. A vehicle snubber comprising a drum housing carried by the vehicle frame and held stationary therewith, a drum rotatable within the housing, means connecting the vehicle axle and drum for rotating the latter, a friction band carried by the drum, a wedge shaped braking member mounted between the drum and housing for offering resistance to their relative movement, and means for adjusting the braking member on the periphery of the drum.

4. A vehicle snubber comprising a drum housing carried by the vehicle frame, a drum rotatable within the housing, means connecting the vehicle axle and drum for rotating the latter, a friction band carried by the drum, a wedge shaped braking member mounted between the drum and housing for offering resistance to their relative movement, and resilient means tending to maintain the braking member in its position on the drum.

5. A vehicle shock absorber comprising a drum housing carried by the vehicle frame, a drum having a friction surface movable with the vehicle axle, and a pair of oppositely directed wedge shaped braking elements contacting with the drum and housing and offering resistance to their relative movement.

6. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, an arcuate wedge-shaped braking element positioned between said members for frictional engagement therewith and movable in a direction circumferentially of the drum member, an adjusting rod, a link connecting said rod and braking element, and means permitting adjustment of said rod to variably limit the movement of the braking element circumferentially of the drum member.

7. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, an arcuate wedge-shaped braking element positioned between said members for frictional engagement therewith and movable in a direction circumferentially of the drum member, an adjusting rod, a link connecting said rod and braking element, and means permitting adjustment of said rod to variably limit the movement of the braking element circumferentially of the drum member, and a spring acting to position the braking element into wedging engagement with the said members.

8. In combination with a vehicle frame and a vehicle part movable relative to the frame, means for opposing said relative movement comprising a housing member, a second member within said housing member, one of said members being secured to the frame and immovable relative thereto and the other of said members being connected with the said vehicle part whereby upon relative movement of the vehicle part and frame the said members are relatively rotated, a wedge-shaped braking element positioned between said members for frictional engagement therewith and movable in a direction circumferentially of the second said member, an adjusting rod, a link connecting said rod and braking element, and means permitting adjustment of said rod to variably limit the movement of the braking element circumferentially of the second member.

9. In combination with a vehicle frame and a vehicle part movable relative to the frame, means for opposing said relative movement comprising a housing member, a second member within said housing member, one of said members being secured to the frame and immovable relative thereto and the other of said members being connected with the said vehicle part whereby upon relative movement of the vehicle part and frame the said members are relatively rotated, a wedge-shaped braking element positioned between said members for frictional engagement therewith and movable in a direction circumferentially of the second said member, an adjusting rod, a link connecting said rod and braking element, means permitting adjustment of said rod to variably limit the movement of the braking element circumferentially of the second member, and a spring acting to position the braking element into wedging engagement with said members.

10. In combination with a vehicle frame and a vehicle part movable relative to the frame, means for opposing said relative movement comprising relatively rotatable members respectively connected to the said frame and vehicle part, a wedge-shaped braking element frictionally engaging said fixed and rotatable members, and adjustable means for limiting the movement of the braking element circumferentially of the said rotatable member.

11. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, an arcuate wedge-shaped braking element positioned between said members for frictional engagement therewith and movable in a direction circumferentially of the drum member, and means positioned exteriorly of the said drum housing for limiting the movement of the braking element circumferentially of the said rotatable member.

12. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, an arcuate wedge-shaped braking element positioned between said members for frictional engagement therewith and movable in a direction circumferentially of the drum member, said drum housing being formed with a bored projection, an adjusting rod extending through said bore, a link connecting said rod and braking element, a spring within the projection and encircling the rod to position the braking element into wedging engagement with said members, and means engageable with said rod exteriorly of said projection permitting adjustment of said rod to variably limit the movement of the braking element circumferentially of the drum member.

13. In combination with a vehicle frame and a vehicle part movable relative to the frame, means for opposing said relative movement comprising relatively rotatable members, one of which is secured to the frame, and the other being connected with the vehicle part whereby upon relative movement of the vehicle part and frame, the said members are relatively rotated, one of said members having an arcuate surface, a braking element positioned between said members for frictional engagement therewith and movable in a direction circumferentially of the said arcuate surface, and adjusting means for variably limiting the circumferential movement of the braking element.

14. In combination with a vehicle frame and a vehicle part movable relative to the frame, means for opposing said relative movement comprising relatively rotatable members respectively connected to said frame and vehicle part, and a pair of oppositely directed wedge-shaped braking elements frictionally engaging said relatively rotatable part.

15. In combination with a vehicle frame and a vehicle part movable relative to the frame, means for opposing said relative movement comprising relatively rotatable members, one of which is secured to the frame, and the other being connected with the vehicle part whereby upon relative movement of the vehicle part and frame the said members are relatively rotated, one of said members having an arcuate surface, and a pair of oppositely directed wedge-shaped braking elements positioned between said members for frictional engagement therewith and relatively movable toward each other circumferentially of the said arcuate surface.

16. In combination with a vehicle frame and a vehicle part movable relative to the frame, means for opposing said relative movement comprising relatively rotatable members, one of which is secured to the frame, and the other being connected with the vehicle part whereby upon relative movement of the vehicle part and frame the said members are relatively rotated, one of said members having an arcuate surface, a pair of oppositely directed wedge-shaped braking elements positioned between said members for frictional engagement therewith and relatively movable toward each other circumferentially of the said arcuate surface, and resilient means acting to position the braking elements into wedging engagement with the said members.

17. In combination with a vehicle frame and a vehicle part movable relative to the frame, means for opposing said relative movement comprising relatively rotatable members, one of which is secured to the frame, and the other being connected with the vehicle part whereby upon relative movement of the vehicle part and frame the said members are relatively rotated, one of said members having an arcuate surface, a pair of oppositely directed wedge-shaped braking elements positioned between said members for frictional engagement therewith and relatively movable toward each other circumferentially of the said arcuate surface, and adjustable means for limiting the circumferential wedging movement of the braking elements.

18. In combination with a vehicle frame and a vehicle part movable relative to the frame, means for opposing said relative movement comprising relatively rotatable members, one of which is secured to the frame, and the other being connected with the vehicle part whereby upon relative movement of the vehicle part and frame the said members are relatively rotated, one of said members having an arcuate surface, a pair of oppositely directed wedge-shaped braking elements positioned between said members for frictional engagement therewith and relatively movable toward each other circumferentially of the said arcuate surface, adjustable means for limiting the circumferential wedging movement of the braking elements, independently of each other.

19. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, and a pair of oppositely directed wedge-shaped braking elements positioned between said members for frictional engagement therewith.

20. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, a pair of oppositely directed wedge-shaped braking elements positioned between said members for frictional engagement therewith, and adjustable means operably controlled exteriorly of the drum housing for limiting the circumferential wedging movement of the braking elements.

21. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, a pair of oppositely directed wedge-shaped braking elements positioned between said members for frictional engagement therewith, adjusting rods, links connecting said rods and braking elements respectively, and means permitting adjustment of said rods independently of each other to variably limit the movement of the braking elements circumferentially of the drum member.

22. In combination with a vehicle frame and vehicle part movable relative to the frame, means for opposing said relative movement comprising a drum housing member and a drum member mounted within the housing member, one of said members being secured to the frame and immovable relative thereto and the other of said members being connected with the said vehicle part whereby upon relative movement of the vehicle part and frame the said members are relatively rotated, a pair of oppositely directed wedge-shaped braking elements positioned between said members for frictional engagement therewith, adjusting rods, links connecting said rods and braking elements respectively, means permitting adjustment of said rods independently of each other to variably limit the movement of the braking elements, circumferentially of the drum member, and springs acting to position the braking elements into wedging engagement with said members.

In testimony whereof I affix my signature.

HENRY SMITH.